(12) United States Patent
Hatlo et al.

(10) Patent No.: US 10,641,424 B2
(45) Date of Patent: May 5, 2020

(54) SUBSEA DIRECT ELECTRIC HEATING SYSTEM

(71) Applicant: NEXANS, Courbevoie (FR)

(72) Inventors: Marius Hatlo, Fredrikstad (NO); Oyvind Iversen, Ski (NO)

(73) Assignee: NEXANS, Courbevoie (FR)

(*) Notice: Subject to any disclaimer, the term of this patent is extended or adjusted under 35 U.S.C. 154(b) by 330 days.

(21) Appl. No.: 15/834,883

(22) Filed: Dec. 7, 2017

(65) Prior Publication Data
US 2018/0163910 A1   Jun. 14, 2018

(30) Foreign Application Priority Data

Dec. 13, 2016  (EP) .................................. 16306669

(51) Int. Cl.
| F16L 53/34 | (2018.01) |
| F16L 53/38 | (2018.01) |
| F16L 53/37 | (2018.01) |
| E21B 36/04 | (2006.01) |
| H05B 3/00 | (2006.01) |
| G05F 3/04 | (2006.01) |
| H01B 7/04 | (2006.01) |

(52) U.S. Cl.
CPC .............. *F16L 53/34* (2018.01); *E21B 36/04* (2013.01); *F16L 53/38* (2018.01); *H05B 3/0004* (2013.01); *F16L 53/37* (2018.01); *G05F 3/04* (2013.01); *H01B 7/045* (2013.01); *H05B 2214/03* (2013.01)

(58) Field of Classification Search
None
See application file for complete search history.

(56) References Cited

U.S. PATENT DOCUMENTS

| 3,766,357 | A | * | 10/1973 | Koester, Jr. | ............. | F24H 1/142 |
| | | | | | | 392/478 |
| 4,578,564 | A | * | 3/1986 | Ando | ................... | G01R 31/021 |
| | | | | | | 137/341 |
| 6,509,557 | B1 | * | 1/2003 | Bass | ...................... | H05B 6/108 |
| | | | | | | 219/772 |
| 8,162,059 | B2 | * | 4/2012 | Nguyen | .................. | E21B 43/24 |
| | | | | | | 166/302 |

(Continued)

OTHER PUBLICATIONS

Search Report dated May 23, 2017.

*Primary Examiner* — Thor S Campbell
(74) *Attorney, Agent, or Firm* — Sofer & Haroun, LLP

(57) ABSTRACT

A subsea direct electric heating system has a subsea pipeline which has an electrically conducting pipeline material, and a first piggyback cable extending along a portion of the subsea pipeline, electrically connected in series with the subsea pipeline. The system further comprises a topside AC power supply and a power feeder cable which extends from the topside AC power supply to a subsea location. The power feeder cable feeds electric power to the first piggyback cable and the pipeline, resulting in a heating of the pipeline. In order to improve power conditions in the system, the arrangement for reducing the reactive component of the power comprises the power feeder cable, the power feeder cable having a distributed capacitance which is sufficient, in the absence of a capacitor, to result in a power factor of an electric circuit comprising the power feeder cable, the subsea pipeline and the piggyback cable in the range 0.9 to 1.0.

19 Claims, 3 Drawing Sheets

(56) References Cited

U.S. PATENT DOCUMENTS

| | | | |
|---|---|---|---|
| 2009/0214196 A1* | 8/2009 | Bremnes | H05B 3/023 |
| | | | 392/480 |
| 2010/0089584 A1* | 4/2010 | Burns | E21B 43/2401 |
| | | | 166/302 |
| 2010/0133901 A1* | 6/2010 | Zhang | H02M 5/458 |
| | | | 307/11 |
| 2010/0258265 A1* | 10/2010 | Karanikas | E21B 43/243 |
| | | | 165/45 |
| 2011/0290497 A1* | 12/2011 | Stenevik | E21B 43/017 |
| | | | 166/345 |
| 2012/0018140 A1* | 1/2012 | Parsche | E21B 43/2401 |
| | | | 166/60 |
| 2012/0319628 A1* | 12/2012 | Rongve | H02P 23/14 |
| | | | 318/400.02 |
| 2013/0108251 A1* | 5/2013 | Denniel | F16L 9/00 |
| | | | 392/468 |
| 2014/0016918 A1* | 1/2014 | Lervik | F17D 1/18 |
| | | | 392/482 |
| 2014/0376900 A1* | 12/2014 | Bjerknes | H05B 3/023 |
| | | | 392/480 |
| 2015/0016812 A1* | 1/2015 | Radan | H02J 3/18 |
| | | | 392/478 |
| 2015/0108952 A1 | 4/2015 | Moeller et al. | |
| 2015/0315887 A1* | 11/2015 | Behr | E21B 36/04 |
| | | | 166/302 |
| 2016/0116097 A1* | 4/2016 | Akers | F16L 53/34 |
| | | | 219/643 |
| 2019/0373677 A1* | 12/2019 | Perera | H05B 3/0023 |

* cited by examiner

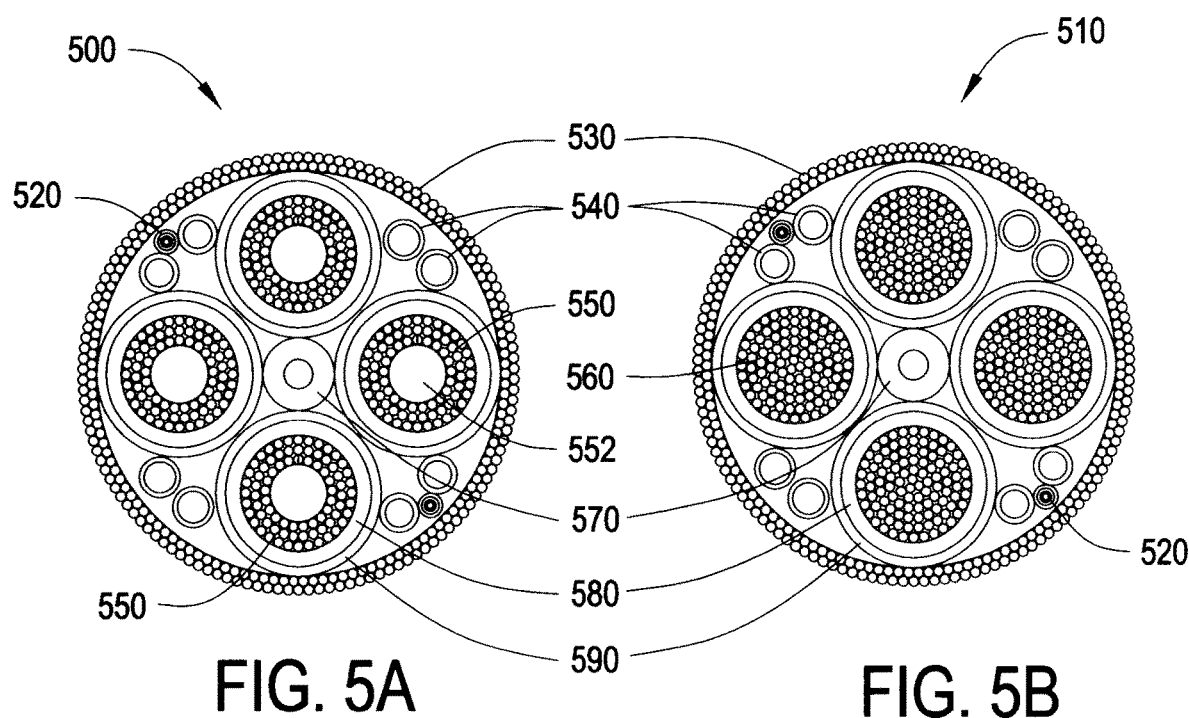
FIG. 5A  FIG. 5B
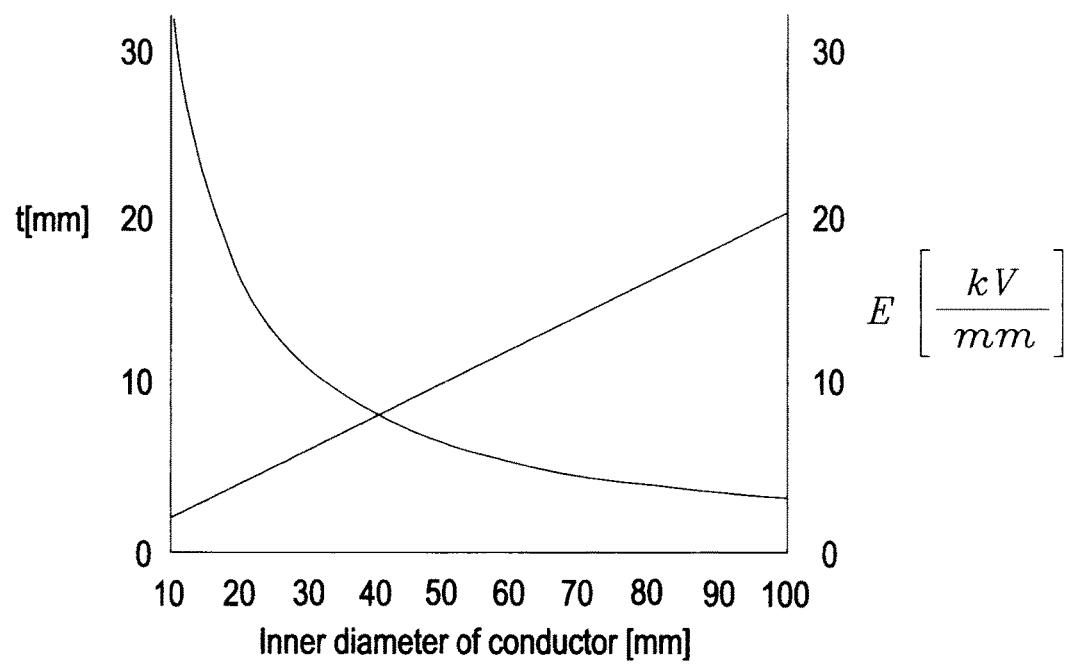
FIG. 6

SUBSEA DIRECT ELECTRIC HEATING SYSTEM

This application claims the benefit of priority from European Patent Application No. 16 306 669.9, filed on Dec. 13, 2016, the entirety of which is incorporated by reference.

TECHNICAL FIELD

The present invention relates to a subsea direct electric heating system and a subsea direct electric heating cable set.

More particularly, the invention relates to a subsea direct electric heating system, comprising a subsea pipeline, the pipeline comprising an electrically conducting pipeline material; at least one piggyback cable extending along a portion of the subsea pipeline, connected in series with the subsea pipeline; a topside AC power supply; a power feeder cable extending from the topside AC power supply to a subsea location, the power feeder cable feeding electric power to the piggyback cable and the pipeline, resulting in a heating of the pipeline; and an arrangement for reducing a reactive component of the power fed to the subsea pipeline.

The invention also relates to a subsea direct electric heating cable set, comprising at least one piggyback cable extending along a portion of a subsea pipeline that comprises an electrically conducting pipeline material, the piggyback cable being electrically connected in series with the subsea pipeline; a power feeder cable extending from a topside AC power supply to a subsea location, the power feeder cable feeding electric power to the piggyback cable and the pipeline, resulting in a heating of the pipeline; and an arrangement for reducing a reactive component of the power fed to the subsea pipeline.

BACKGROUND

There is a general need for heating subsea pipelines.

Oil/gas installations may typically have multiple wells tied back to a single floating structure, located near the wells. Unprocessed hydrocarbon (crude oil/gas) exits the well at high temperature and high pressure, and must be kept warm to prevent hydrates or wax from clogging up the pipeline. Pipelines are therefore thermally insulated to ensure flow during normal production. There can be many kilometers between the well and the platform, and cold, surrounding seawater leads to heat loss in the flowing hydrocarbon. In the event of production shut-down, the hydrocarbon in the pipeline will cool over time. This can lead to the formation of wax or hydrate plugs when the temperature drops below a critical level. Such formation of wax or hydrate should be avoided.

Direct Electrical Heating (DEH) systems have been developed to eliminate or alleviate problems associated with wax or hydrate plug formation. In a typical DEH system, a feeder cable supplies power from the topside (e.g., a platform) down to the sea bed. The feeder cable is connected to the pipeline and to a piggyback cable which extends along the pipeline. The feeder cable typically contains two conductors, one connected to the pipeline at the platform end and the other connected to the piggyback cable. Electric current is conducted through the piggyback cable and the conductive material (typically steel) of the pipeline, in parallel with surrounding sea water. Heat is directly generated in the pipeline material due to the material's resistive properties.

Alternating current (AC) is used to supply DEH systems. Since a typical DEH system constitutes a highly inductive load (its power factor is low), a capacitor arrangement, usually arranged topside, has previously been provided to compensate for the inductive load, i.e. to reduce the amount of reactive power. If a capacitor is located subsea this allows for reduced dimensions of conductors in the feeder cable. However, such a capacitor arrangement involves increased costs, is usually bulky and heavy, and represents a possible source of failure.

WO-2013/124270 describes an example of a DEH system, wherein a capacitor arrangement is provided to balance the inductive load with the power supply. The capacitor arrangement may be located topside or subsea.

SUMMARY OF THE INVENTION

There is a need for providing an improved DEH system and an improved DEH cable set of the type mentioned in the introduction.

In particular, there is a need for such a system and cable set which are more reliable, more robust, smaller and/or lighter than existing systems and cable sets.

This need has been met by a system and a cable set as mentioned in the introduction, wherein the arrangement for reducing the reactive component of the power comprises the power feeder cable, the power feeder cable having a distributed capacitance which is sufficient, in the absence of a capacitor, to result in a power factor of an electric circuit comprising the power feeder cable, the subsea pipeline and the piggyback cable in the range 0.9 to 1.0.

This leads to the advantage that a separate capacitor arrangement is not necessary for the purpose of reducing the reactive component of the power fed to the subsea pipeline. In turn, this leads to further advantages such as increased reliability, robustness, as well as reduced size and weight of the system as a whole.

As used herein, the term "distributed capacitance" of a cable means capacitance that exists between conductors of the cable, as distinguished from capacitance that is concentrated in a discrete capacitor element.

Power in an electric circuit is the rate of flow of energy past a given point of the circuit. In alternating current circuits, energy storage elements such as inductors and in an electric circuit is the rate of flow of energy past a given point of the circuit. In alternating current circuits, energy storage elements such as inductors and capacitors, or circuit elements that have inductive or capacitive properties, may result in periodic reversals of the direction of energy flow. The portion of power that, averaged over a complete cycle of the AC waveform, results in net transfer of energy in one direction is known as the active power component.

Hence, as used herein, the term "reactive component" of power fed to the subsea pipeline means the component of the power fed to the subsea pipeline which returns to the power source in each AC cycle.

The invention has been defined by the appended, independent claims 1 and 18.

Advantageous embodiments have been set forth in the dependent claims.

BRIEF DESCRIPTION OF THE DRAWINGS

The present invention will be described in further details with reference to the enclosed figures:

FIGS. 5a and 5b are cross sectional illustrations of two example four conductor feeder cables.

FIG. 6 is a graphic illustration of an insulation thickness and an E-field as a function of conductor diameter.

DETAILED DESCRIPTION

The present invention will be discussed in further detail with reference to the enclosed drawings. It should be noted that the drawings and the detailed description illustrate some possible embodiments, given by way of non-limiting examples.

Figure 1:
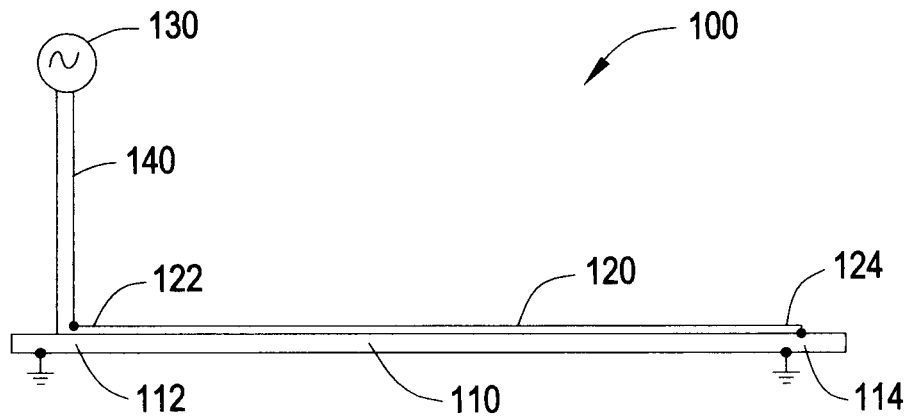
FIG. 1 is a schematic block diagram illustrating an endpoint connected DEH system.
Figure 2:
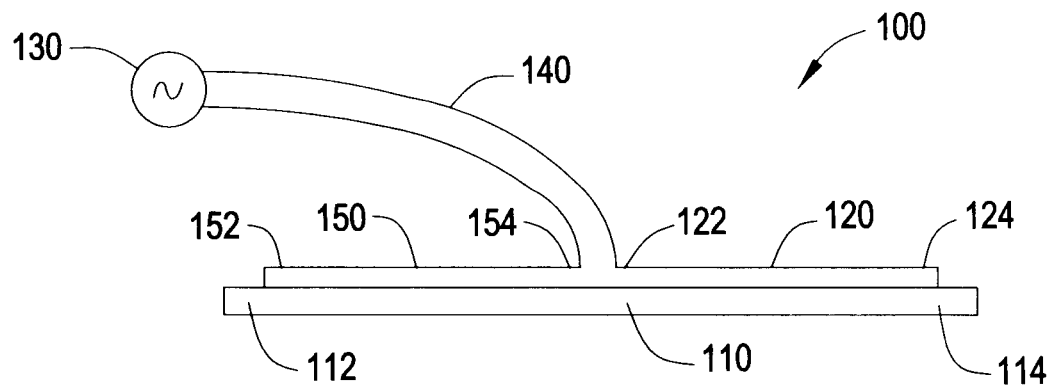
FIG. 2 is a schematic block diagram illustrating a midpoint connected DEH system.

FIG. 1 is a schematic block diagram illustrating an endpoint connected embodiment of the subsea direct electric heating (DEH) system, and FIG. 2 illustrates a similar, midpoint connected embodiment of the subsea direct electric heating (DEH) system.

In both the endpoint connected embodiment of FIG. 1 and the midpoint connected embodiment of FIG. 2, the subsea direct electric heating (DEH) system 100 comprises a pipeline 110 at a subsea location, which includes an electrically conducting pipeline material. The pipeline material may typically be a ferroalloy, such as carbon steel. The pipeline material has resistive properties which causes appropriate heating of the pipeline 110 when an electric current is conducted through the pipeline 110. The purpose of the heating is to avoid or alleviate problems associated with wax or hydrate plug formation within the pipeline 110. The pipeline 110 may be of a regular type used in conventional DEH systems.

A thermal insulation may be provided outside the pipeline in order to reduce heat loss to the sea water.

In a typical application, the pipeline 110 is arranged to convey a hydrocarbon supplied from a subsea hydrocarbon well. The subsea pipeline may be typically be arranged at a depth in the range of 30 through 3000 meters.

The pipeline 110 may typically have a diameter in the range of 4 inches through 40 inches, or 10 cm through 100 cm, and a length in the range of 20 through 250 kilometers.

A first piggyback cable 120 extends along a portion of the subsea pipeline 110 and is electrically connected in series with the subsea pipeline 110.

In both embodiments the system 100 further comprises a topside AC power supply 130 and a power feeder cable 140 extending from the topside AC power supply 130 to the subsea location of the pipeline 110. The power feeder cable 140 feeds electric power to the first piggyback cable 120 and the pipeline 110, which results in a heating of the pipeline 110.

The topside AC power supply may typically be enabled to supply a voltage in the range of 0.1 through 100 kV and a current of 400 through 2000 A.

Also, in both embodiments, the system further includes an arrangement for reducing a reactive component of the power fed to the subsea pipeline 110.

As opposed to the prior art solutions which make use of a bulky capacitor arrangement connected in the system, a distributed capacitance provided by the power feeder cable 140 is utilized as the arrangement for reducing a reactive component of the power fed to the subsea pipeline 110. As a result, the power feeder cable itself constitutes a sufficient arrangement for reducing the reactive component of the power fed to the subsea pipeline 110.

In particular, the arrangement for reducing the reactive component of the power comprises the power feeder cable 140, and the power feeder cable 140 has a distributed capacitance which is sufficient, in the absence of a capacitor, to result in a power factor of an electric circuit comprising the power feeder cable 140, the subsea pipeline 110 and the first piggyback cable 120 in the range 0.9 to 1.0.

Particularly advantageously, the distributed capacitance of the feeder cable 140 is adapted in such a way that the resulting power factor of this electric circuit is close to 1.0 or substantially equal to 1.0, or equal to 1.0.

Advantageously, the distributed capacitance of the power feeder cable 140 is uniformly distributed along the power feeder cable 140. For instance, the distributed capacitance of the feeder cable 140 may be uniform and the same along the entire length of the feeder cable 140.

When adapting the distributed capacitance to obtain the desired power factor of the circuit comprising the power feeder cable 140, the subsea pipeline 110 and the piggyback cable 120, the following directions may apply:

The power factor of the circuit may be measured by means of appropriate measurement equipment that is well-known to the skilled person, such as a power factor meter connected at the power supply 130. Further, the skilled person will realize that the power factor may be calculated as the active power delivered by the power supply, divided by the product of the absolute value of the voltage provided by power supply 130 and the absolute value of the current conducted in the power feeder cable 140. Also, the power factor may readily be calculated as the cosine of the phase angle between the current conducted in the power feeder cable 140 and the voltage across the power supply 130.

Also, the skilled person will realize that a resulting power factor of 1.0 in the circuit comprising the power feeder cable 140, the subsea pipeline 110 and the piggyback cable 120 may be identified by determining that the the current conducted in the power feeder cable 140 and the voltage across the power supply 130 are in-phase, i.e. that the phase angle between the current conducted in the power feeder cable 140 and the voltage across the power supply 130 is zero.

Possible aspects relating to determining the necessary capacitance of the power feeder cable 140 have been described below with reference to the equivalent circuit and the equation shown in FIG. 3.

Once the desired capacitance of the power feeder cable has been determined, and based on the invention's appreciation that the power feeder cable's distributed capacitance shall be utilized for obtaining the desired power factor, the distributed capacitance may be adapted by adapting various structural features of the power feeder cable. Such features include the basic structure of the power feeder cable, such as the number of parallel connected conductors (e.g., two conductors or two pairs of parallel connected conductors), the thickness of an insulation of a conductor, and the relative permittivity of a material of the insulation. Such aspects have been elaborated in closer detail below with reference to FIGS. 3, 4, 5 and 6.

Referring now to the endpoint connected embodiment of the subsea DEH system illustrated in FIG. 1, the pipeline 110 has a first connection area 112 and a second connection area 114. Further, the first piggyback cable 120 has a first end 122 and a second end 124. The second end 124 of the first piggyback cable and the second connection area 114 of the pipeline are electrically interconnected. The power feeder cable 140 is connected to the first end 122 of the piggy back cable 120 and the first 112 connection area of the pipeline 110.

Reference is now made to the embodiment of the midpoint connected DEH system which is illustrated in FIG. 2. In this embodiment, the pipeline 110 has a first connection area 112 and a second connection area 114, and the first piggyback cable 120 has a first end 122 and a second end 124. The second end 124 of the first piggyback cable 120 and the second connection area 114 of the pipeline 110 are electrically interconnected.

In order to obtain a midpoint fed system, the FIG. 2 embodiment also comprises a second piggyback cable 150 which extends along a portion of the subsea pipeline 110. The second piggyback cable has a first 152 and a second 154 end. The first end 152 of the second piggyback cable 150 and the first connection area 112 of the pipeline 110 are electrically interconnected.

Moreover, the power feeder cable 140 is connected to the first end 122 of the first piggyback cable 120 and the second end 154 of the second piggyback cable 154.

Figure 3:
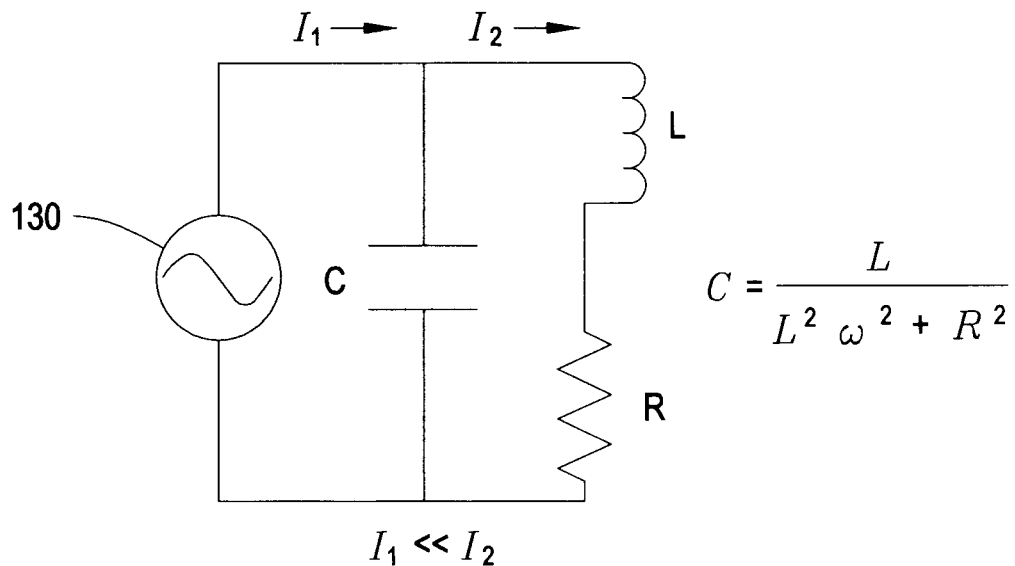
FIG. 3 is a schematic circuit diagram illustrating an equivalent circuit of a DEH system.
Figure 4:
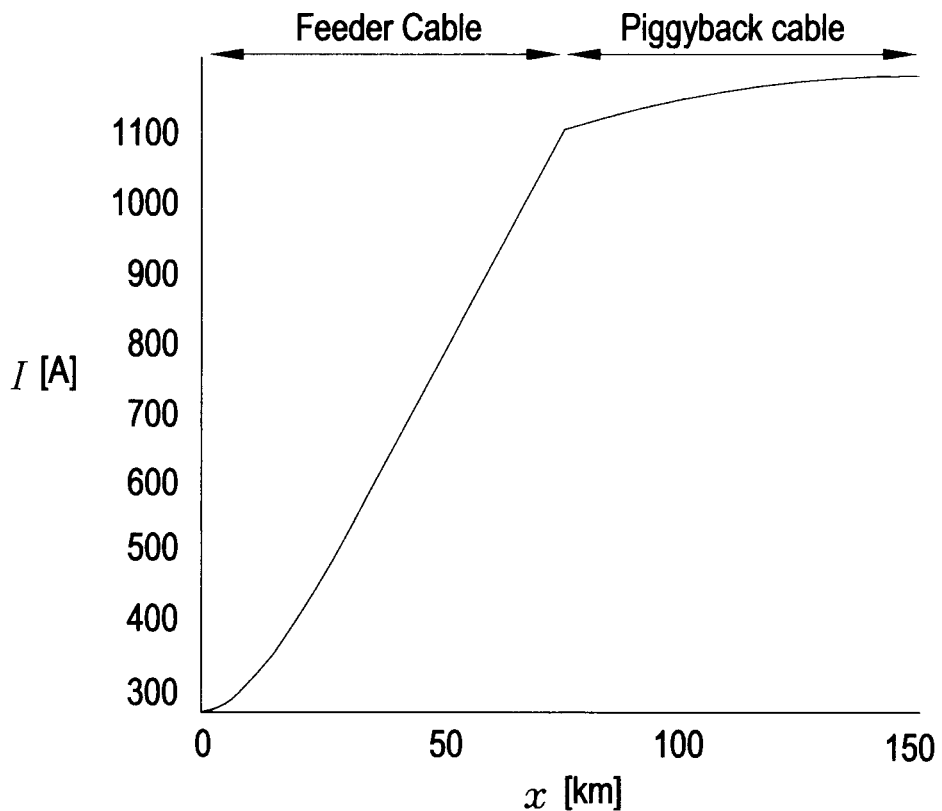
FIG. 4 is a graph illustrating a current in a feeder cable and a piggyback cable.

FIG. 3 is a schematic circuit diagram illustrating an equivalent circuit of a DEH system.

The circuit of FIG. 3 is an RLC circuit, including an AC power supply (the topside AC power supply 130, connected in parallel with a resulting capacitance C and further in parallel with a series circuit consisting of a resulting inductance L in series with a resulting resistance R. The inductance L and resistance R represent the inductance and resistance, respectively, of the series connection of the supply cable, the piggyback cable and the pipeline.

According to the present invention, a distributed capacitance provided by the power feeder cable 140 is utilized as the arrangement for reducing a reactive component of the power fed to the subsea pipeline 110. More specifically, the distributed capacitance of the power feeder cable 140 may be uniformly distributed along the power feeder cable 140. The feeder cable 140 is designed in such a way that a resulting power factor of an electric circuit comprising the power feeder cable 140, the subsea pipeline 110 and the piggyback cable 120 is in the range 0.9 to 1.0.

The above features lead to the advantage that the capacitor bank used in prior art solutions may be limited or avoided, which again results in increased reliability and robustness, as well as reduced size and weight of the system as a whole.

According to an aspect, when adapting the necessary capacitive properties of the power feeder cable 140, the total capacitance of the power feeder cable 140 may be calculated according to the equation in FIG. 3. In this situation, the system is in resonance and the circuit seen from the topside power supply 130 is purely active. Under the resonance conditions the current $I_1$ flowing into the power feeder cable 140 is much smaller than the current $I_2$ flowing into the piggyback cable 120.

In an exemplary aspect, for the DEH system to function properly, the current $I_2$ should normally be in the range 9000-1500 A at 50/60 Hz. For higher frequencies lower current is needed. The current $I_1$ flowing into the power feeder cable 140 may only be in the order of 25% of the total current $I_2$.

The formula shown in FIG. 3 gives an estimate of the cable capacitance needed in the power feeder cable 140. If necessary, more accurate calculations may be performed with distributed parameters.

In an aspect, the distributed capacitance of the power feeder cable 140 may be adapted by selecting a thickness of an outer insulation layer of each conductor in the power feeder cable. In another aspect, the distributed capacitance of the power feeder cable 140 may alternatively or additionally be adapted by selecting a relative permittivity of the insulation material Examples of such insulation materials may include cross-linked polyethylene, XLPE, polyvinyl chloride, PVC, and ethylene propylene rubber, EPR.

As an illustrative example, a DEH system with a 150 km long pipeline has been provided with a current demand in the piggyback cable 120 of 1100 A (at 50 Hz). The resulting current profile along the power feeder cable 140 (75 km) and half the piggyback cable (75 km) has been shown in FIG. 4.

The distributed capacitance used in this example (1.45 µF/km) may be obtained for example by the use of a four conductor power feeder cable 140. In this case, the four conductors may advantageously include two pairs of parallel connected conductors.

For shorter lengths, such as less than 150 km, a higher frequency (for example 100 5 Hz or more) and a two-conductor power feeder cable may advantageously be used. The distributed capacitance needed in the 75 km long power feeder cable 140 for a 150 km long pipeline 110 may be 1.45 µF/km (determined from calculations with distributed parameters). Using a four conductor cable with two phases parallel coupled, this implies a distributed capacitance of each phase of C=1.45/2=0.725 µF/km. The distributed capacitance of each phase may be calculated with the formula $$C = \frac{\varepsilon_r}{18\ln\left(\frac{d_{out}}{d_{in}}\right)}$$

wherein $d_{in}$ is the diameter over the inner semiconducting sheath, $d_{out}$ is the diameter over the cable insulation, and $\varepsilon_r$ is the relative permittivity of the cable insulation, typically XLPE with $\varepsilon_r$=2.3-2.5.

The distributed capacitance can be adapted by varying the inner and outer diameter of the insulation, and/or in combination with the selection of a material with different permittivity than cross-linked polyethylene, XLPE.

The amount of conducting material used in the conductor, for example Cu or Al, may be determined by conventional methods, taking into account the temperature limit of the cable insulation.

If the corresponding diameter of the conductor is too small to obtain the needed distributed capacitance, the conductor diameter may be modified by using a hollow conductor or a conductor with an inner cavity filled with another material than typically utilized for increasing conducting cross section area, cf. also FIG. 5a. The material may e.g. be another metallic material (such as, but not limited to steel or aluminum), or it may be a non-metallic material such as a composite or plastic material. Alternatively the inner cavity may be a tube filled with air or another gaseous medium. If needed the hollow conductor may contain armour wires in the middle (for strength and reduction of total cable cross section).

For the example given above, with 150 km flowline, the calculated topside line voltage, i.e. the voltage of the power supply 130, may be 53 kV. The insulation thickness of the power feeder cable that gives a power factor equal to unity and corresponding electric field at inner semiconductor is plotted in FIG. 6 as a function of the diameter of the conductor.

The diameter of the conductor may be determined based on the maximum allowable electric field in the insulation. The maximum allowable electric field in the insulation will depend on type of insulation, and may for example be in the region 3-4 kV/mm for phases without water barrier, and 8-9 kV/mm for phases with water barrier. For the example with 150 km flowline and 1100 A current demand, a conductor diameter of din=50 mm gives t=10 mm and maximum electric field of 6.5 kV/mm.

FIGS. 5a and 5b are cross sectional illustrations of two four conductor power feeder cables.

The four conductor power feeder cable 500 illustrated in FIG. 5a includes hollow conductors, or alternatively conductors with a cavity filled with another material, as has been explained above. The four conductor cable 510 illustrated in FIG. 5b includes non-hollow conductors.

FIG. 5a shows the four conductor cable 500 having four conductors that may advantageous be equal. Each conductor in the power feeder cable 140 includes an outer portion comprising an electrically conductive material and a coaxially arranged, inner portion which may be hollow. One of the hollow conductors has been shown at 550, having a hollow cavity 552.

Alternatively, the inner portion may comprise a material different from the electrically conductive material of the outer portion. In this case, the hollow cavity 552 may be replaced with a centre element made of a different material than the bulk of the conductor 550.

In any of the above alternatives, the majority of the current in each conductor will be transmitted in the outer section of the conductor due to the skin effect.

FIG. 5a also shows that each hollow conductor 550 may surrounded by an inner semiconductor insulation 580, which is further surrounded by an outer 30 semiconductor sheath. The diameter and/or material of the material in the semiconductor insulation 580 may be varied in order to adjust the distributed capacitance of the four conductor cable.

FIG. 5b shows an alternative four conductor cable 510 with four non-hollow conductors. One of the non-hollow conductors has been illustrated at 560. In this 35 case the conductor may include the same conductive material throughout its cross-section.

As shown in both FIGS. 5a and 5b, each of the four conductor cables may additionally include one or more fibre optic cables 520, a plurality of steel tubes 540 (by example, 8 steel tubes for each four conductor cable), an outer armouring 530, and a cable core or inner filler element 570.

In each of the example four-conductor cables 500 and 510, when used in a subsea direct electric heating system or in a subsea direct electric heating cable set, the distributed capacitance of the power feeder cable may be modified by varying an insulation diameter, and/or by varying an relative permittivity of an insulation material.

FIG. 6 is a graphic illustration of an insulation thickness and an E-field as a function of conductor inner diameter.

The graph 610 illustrates insulation thickness t in mm as a function of inner diameter of conductor (mm). The insulation thickness t shown by the graph is the insulation thickness that gives a per phase capacitance of C=0.725 μF/km. The graph 620 illustrates corresponding electric field as a function of an inner diameter of a conductor (mm).

In the disclosed embodiments of the invention, a separate capacitor arrangement is not necessary for the purpose of obtaining a substantial reduction of reactive power fed to the subsea pipeline. However, a capacitor arrangement may still be arranged in parallel with the power feeder cable, in particular at a topside location, in order to make less significant adjustments of the reactive power and hence the resulting power factor.

The invention has been described with reference to exemplary embodiments which are not intended to restrict the scope of the invention. The scope of the invention has been set forth in the claims.

The invention claimed is:

1. Subsea direct electric heating system, comprising
   a subsea pipeline, the pipeline comprising an electrically conducting pipeline material;
   at least one piggyback cable extending along a portion of the subsea pipeline, electrically connected in series with the subsea pipeline;
   a topside AC power supply;
   a power feeder cable extending from the topside AC power supply to a subsea location, the power feeder cable feeding electric power to the piggyback cable and the pipeline, resulting in a heating of the pipeline; and
   an arrangement for reducing a reactive component of the power fed to the subsea pipeline;
   wherein the arrangement for reducing the reactive component of the power comprises the power feeder cable, the power feeder cable having a distributed capacitance which is sufficient, in the absence of a capacitor, to result in a power factor of an electric circuit comprising the power feeder cable, the subsea pipeline and the piggyback cable in the range 0.9 to 1.0.

2. System according to claim 1, wherein the distributed capacitance of the power feeder cable is uniformly distributed along the power feeder cable.

3. System according to claim 1, wherein the power feeder cable includes four conductors, including two pairs of parallel connected conductors.

4. System according to claim 3, wherein the four conductors are arranged axially around a central cable core.

5. System according to claim 3, wherein each conductor in the power feeder cable includes an outer portion comprising an electrically conductive material and a coaxially arranged, inner portion which is hollow or comprises a material different from the electrically conductive material of the outer portion.

6. System according to claim 1, wherein the distributed capacitance of the power feeder cable is adapted by selecting a thickness of an outer insulation layer of each conductor in the power feeder cable.

7. System according to claim 1, wherein the distributed capacitance of the power feeder cable is adapted by selecting a relative permittivity of a material of an outer insulation layer of each conductor in the power feeder cable.

8. System according to claim 1, wherein the pipeline has a first connection area and a second connection area, the at least one piggyback cable includes a first piggyback cable, the first piggyback cable has a first end and a second end, the second end of the first piggyback cable and the second connection area of the pipeline being electrically interconnected, the power feeder cable being connected to the first end of the piggy back cable and the first connection area of the pipeline.

9. System according to claim 1, wherein the pipeline has a first connection area and a second connection area, the at least one piggyback cable includes a first piggyback cable and a second piggyback cable, the first piggyback cable has a first end and a second end, the second end of the first piggyback cable and the second connection area of the pipeline being electrically interconnected, the second piggyback cable extending along a portion of the subsea pipeline, the second piggyback cable having a first and a second end, the first end of the second piggyback cable and the first connection area of the pipeline being electrically interconnected, the power feeder cable being connected to the first end of the first piggy back cable and the second end of the second piggyback cable.

10. System according to claim 1, wherein the pipeline is arranged to convey a hydrocarbon supplied from a subsea hydrocarbon well.

11. System according to claim 1, wherein the pipeline material is a ferroalloy.

12. System according to claim 1, wherein the capacitance of the power feeder cable is $$C = \frac{L}{L^2\omega^2 + R^2}$$

wherein L is an inductance of a series connection of the power feeder cable, the at least one piggyback cable and the subsea pipeline, and wherein R is a resistance of a series connection of the power feeder cable, the at least one piggyback cable and the subsea pipeline.

13. System according to claim 1, wherein the distributed capacitance of the power feeder cable is in the range 1.0 to 2.0 µF/km, or in the range 1.3 to 1.6 µF/km, or preferably 1.45 µF/km.

14. System according to claim 1, wherein the power feeder cable is a four conductor cable with two phase conductors parallel coupled, wherein the distributed capacitance of each phase conductor is in the range 0.5 to 1.0 µF/km, or in the range 0.65 to 0.8 µF/km, or preferably 0.725 µF/km.

15. System according to claim 1, wherein the power feeder cable is a four conductor cable with two phase conductors parallel coupled, wherein the distributed capacitance of each phase conductor is calculated with the formula $$C = \frac{\varepsilon_r}{18\ln\left(\frac{d_{out}}{d_{in}}\right)}$$

wherein $d_{in}$ is a diameter over an inner semiconducting sheath of the power feeder cable, $d_{out}$ is a diameter over a cable insulation of the power feeder cable, and $\varepsilon_r$ is a relative permittivity of an insulation of the power feeder cable.

16. System according to claim 1, wherein an insulation of the power feeder cable has a relative permittivity, $\varepsilon_r$, in the range 2.3 to 2.5.

17. System according to claim 16, wherein the insulation of the power feeder cable comprises cross-linked polyethylene, XLPE.

18. Subsea direct electric heating cable set, comprising:
  at least one piggyback cable extending along a portion of a subsea pipeline that comprises an electrically conducting pipeline material, the at least one piggyback cable being electrically connected in series with the subsea pipeline;
  a power feeder cable extending from a topside AC power supply to a subsea location, the power feeder cable feeding electric power to the piggyback cable and the pipeline, resulting in a heating of the pipeline; and
  an arrangement for reducing a reactive component of the power fed to the subsea pipeline;
  wherein the arrangement for reducing the reactive component of the power comprises the power feeder cable, the power feeder cable having a distributed capacitance which is sufficient, in the absence of a capacitor, to result in a power factor of an electric circuit comprising the power feeder cable, the subsea pipeline and the piggyback cable in the range 0.9 to 1.0.

19. Subsea direct electric heating cable set according to claim 18, wherein the distributed capacitance of the power feeder cable is uniformly distributed along the power feeder cable.

* * * * *